United States Patent
Ben-Tzvi et al.

(10) Patent No.: US 10,295,651 B2
(45) Date of Patent: May 21, 2019

(54) LINEAR OPTICAL SENSOR ARRAYS (LOSA) TRACKING SYSTEM FOR ACTIVE MARKER BASED 3D MOTION TRACKING

(71) Applicant: Pinhas Ben-Tzvi, Blacksburg, VA (US)

(72) Inventors: Pinhas Ben-Tzvi, Blacksburg, VA (US); Anil Kumar, Blacksburg, VA (US)

(73) Assignee: Pinhas Ben-Tzvi, Blacksburg, VA (US)

( * ) Notice: Subject to any disclaimer, the term of this patent is extended or adjusted under 35 U.S.C. 154(b) by 30 days.

(21) Appl. No.: 15/709,766

(22) Filed: Sep. 20, 2017

(65) Prior Publication Data

US 2018/0081027 A1 Mar. 22, 2018

Related U.S. Application Data

(60) Provisional application No. 62/397,503, filed on Sep. 21, 2016.

(51) Int. Cl.
*G01S 5/16* (2006.01)
*G01B 11/00* (2006.01)
(Continued)

(52) U.S. Cl.
CPC ............ *G01S 5/163* (2013.01); *G01B 11/002* (2013.01); *G01C 21/00* (2013.01); *G01S 3/781* (2013.01);
(Continued)

(58) Field of Classification Search
CPC ...... G01S 5/163; G01S 5/0294; G01S 5/0284; G01S 3/756; G01S 3/7864; G01S 17/48;
(Continued)

(56) References Cited

U.S. PATENT DOCUMENTS 6,597,443 B2 * 7/2003 Boman .................. G01B 11/22
345/158
6,801,637 B2 * 10/2004 Voronka .................. G06T 7/246
348/169
(Continued)

FOREIGN PATENT DOCUMENTS

WO WO-2010069160 A1 * 6/2010 ............. G01B 11/03

OTHER PUBLICATIONS

Kumar et al. "Spatial Object Tracking System Based on Linear Optical Sensor Arrays", IEEE Sensors Journal, vol. 16, Issue 22, pp. 7933-7940; Nov. 2016 (Year: 2016).*

*Primary Examiner* — John Villecco

(57) ABSTRACT

The present invention is a standalone motion tracking device using Linear Optical Sensor Arrays (LOSA). The invention constitutes a tracker module and an active marker, which communicate with each other wirelessly. The motion tracking device uses optical tracking along with inertial sensing to estimate the position and attitude of the active marker relative to the tracker module. The system determines the position of the active marker using stereovision triangulation through multiple views emanating from different LOSA modules. The present invention also features novel use of a multi-slit aperture for LOSA sensors in order to increase the field of view and resolution of the position estimates. The system uniquely leverages the structural geometry of the active marker, along with inertial sensing, to estimate the attitude of the active marker relative to the tracker module without relying on magnetic sensing that may often be unreliable.

11 Claims, 7 Drawing Sheets

(51) Int. Cl.
   *G01C 21/00* (2006.01)
   *G01S 3/781* (2006.01)
   *G01S 3/786* (2006.01)
   *H04N 13/243* (2018.01)

(52) U.S. Cl.
   CPC ......... *G01S 3/7864* (2013.01); *H04N 13/243* (2018.05); *G06T 2207/30204* (2013.01)

(58) Field of Classification Search
   CPC . G01S 17/06; G06T 2207/30204; G06T 7/70; G06F 3/011; G08B 21/0446; A63F 13/211
   See application file for complete search history.

(56) References Cited

U.S. PATENT DOCUMENTS

| | | | |
|---|---|---|---|
| 6,831,603 B2 | 12/2004 | Menache | |
| 7,561,262 B2* | 7/2009 | Napierala | B64G 1/1085 356/139.03 |
| 7,961,909 B2 | 6/2011 | Mandella et al. | |
| 7,978,311 B2* | 7/2011 | Deliwala | A63F 13/06 356/3.1 |
| 8,031,227 B2* | 10/2011 | Neal | G01S 5/16 348/169 |
| 8,237,101 B2* | 8/2012 | Gunning, III | F41G 3/225 250/203.2 |
| 8,525,983 B2* | 9/2013 | Bridges | G01B 11/03 356/138 |
| 8,625,108 B2* | 1/2014 | Bresciani | B64G 1/1085 356/614 |
| 8,724,104 B2* | 5/2014 | Bresciani | B64G 1/1085 356/139.03 |
| 9,255,986 B2* | 2/2016 | Deliwala | A63F 13/06 |
| 9,261,625 B2* | 2/2016 | Larigani | G01V 7/04 |
| 9,720,087 B2* | 8/2017 | Christen | G01S 5/16 |
| 9,746,544 B2* | 8/2017 | Deliwala | G01S 3/783 |
| 2012/0105821 A1* | 5/2012 | Moser | G01S 17/023 356/3.09 |
| 2014/0043622 A1* | 2/2014 | Vandenhoudt | G01S 3/78 356/614 |
| 2016/0146600 A1* | 5/2016 | Taghavi Larigani | G01B 11/14 702/150 |
| 2018/0089841 A1* | 3/2018 | Dai | G01P 15/18 |

* cited by examiner

LINEAR OPTICAL SENSOR ARRAYS (LOSA) TRACKING SYSTEM FOR ACTIVE MARKER BASED 3D MOTION TRACKING

CROSS-REFERENCE TO RELATED APPLICATION

This application claims priority benefits of the U.S. Patent Provisional Application No. 62/397,503, filed on Sep. 21, 2016. The entirety of the above-mentioned patent applications is hereby incorporated by reference herein and made a part of this specification.

FIELD OF THE INVENTION

The present invention relates to indoor non-contact motion (both linear and rotatory) tracking. The invention has applications in engineering fields such as robotics, navigation, biomechanics and virtual reality which often require real-time indoor motion tracking.

BACKGROUND OF THE INVENTION

As discussed in "Spatial Object Tracking System Based on Linear Optical Sensor Arrays" by Anil Kumar and Pinhas Ben-Tzvi in IEEE Sensors Journal, indoor motion tracking is an extremely critical component in various engineering problems [1]. Researchers from around the world in both academia and industry have been investigating various sensing modalities to develop reliable and accurate indoor motion tracking systems. The list of applications involving motion tracking is endless, however accuracy and the high cost of such systems has limited the use of motion tracking in everyday applications. Existing accurate motion tracking systems are limited solely to research-based applications due their very high cost. To facilitate versatility of motion, non-contact tracking systems are preferred over contact-based systems for most applications.

Optical motion tracking systems are the most common class of non-motion tracking systems. Numerous systems for measuring object surface or point location by optical triangulation exist in the literature. Existing motion tracking systems often use multiple video cameras to estimate the position and orientation of the target. This makes them expensive, dependent on a bulky setup and computationally intensive. Such limitations make the existing systems less mobile and versatile in terms of usage. Many existing inertial tracking systems utilize magnetic measurements for attitude estimation, which can be easily corrupted by stray electromagnetic fields.

SUMMARY OF THE INVENTION

According to an example embodiment of the present invention, an optical motion-tracking device is provided herein. The invention, named LOSA Tracker, is an active marker based 3D tracking system using Linear Optical Sensor Array (LOSA). In various embodiments, the tracking system comprises of two units: 1) LOSA tracking module and 2) omnidirectional active marker. Unlike existing active marker based tracking systems, the various embodiments combine inertial sensing with optical sensing to accurately track position, velocity and attitude of the active marker/object. The LOSA tracker module uses planar stereovision to estimate the position and linear velocity of the active marker. The various embodiments locate the Light Emitting Diode (LED) illuminated active marker by using triangulation on a pinhole camera image of the active marker on a photosensitive area of the LOSA. Various embodiments estimate triangulation disparity by finding the peak value positions of the signals in the sensor array while adjusting for diffraction effects. Thus, each pair of sensor modules facilitates 2D position tracking in the epipolar plane of the sensor pair [2]. A computer fuses the position estimates from stereovision and IMU data from the active marker using Extended Kalman Filter (EKF) to extract more accurate position and attitude estimates.

The active marker of the present invention is unique in the sense that it uses the geometry of the active marker to obtain attitude estimates thereby eliminating the use of a magnetometer, which is not reliable in many scenarios. The LOSA tracker module makes unique use of its geometry to extend the 'field of view' of the sensor while at the same time keeping the cost low by eliminating the use of lenses. The active marker determines a 'Line of Sight' (LoS) vector with respect to the tracker module and uses this vector with an IMU data to estimate the attitude. The active marker sends attitude tracking data to the tracker module and receives position and (IR) LED intensity feedback in return through a high speed wireless network. The LED intensity feedback along with the Line of Sight (LoS) vector tracking makes the system highly power efficient. Low cost of the sensing system makes it an extremely useful tool for robotics and virtual reality applications. The LOSA tracking system can also be used as a wireless human interface device by attaching an active marker to a human body. The actions and movements performed by the user can be linked with predefined computer commands for applications such as playing video games or to perform gesture based control.

BRIEF DESCRIPTION OF THE DRAWINGS

These and other objects of the invention, as well as many of the intended advantages thereof, will become more readily apparent when reference is made to the following description, taken in conjunction with the accompanying drawings.

DETAILED DESCRIPTION OF THE INVENTION

Figure 1:
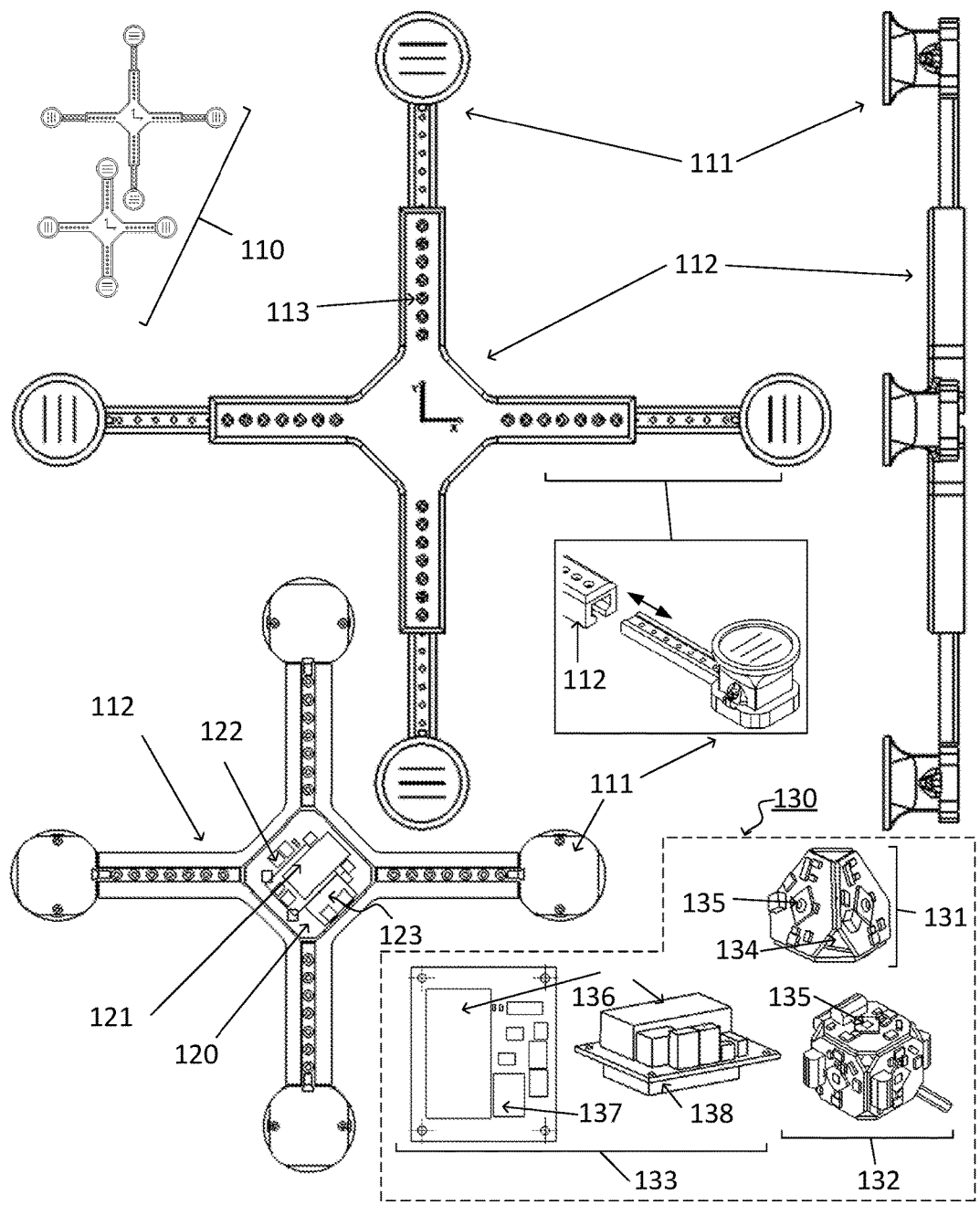
FIG. 1 describes an embodiment of the LOSA tracking system showing both the tracking module and its associated active marker.

In describing the embodiment of the invention illustrated in FIG. 1, specific terminology will be resorted to for the sake of clarity. However, the invention is not intended to be limited to the specific terms so selected, and it is to be understood that each specific term includes all technical equivalents that operate in similar manner to accomplish a similar purpose. In context of the document, the terms 'tracker', 'LOSA tracker', 'tracking system' and 'tracker module' all refer to the LOSA tracker module 110 in the present invention. Similarly, the terms 'marker' and 'active marker' both refer to the active marker 130 of the present invention.

1. LOSA Tracker Module

The LOSA tracker module 110 in the present invention is essentially a planar device with multiple (two or more) linear camera (LOSA) sensor modules 111 distributed uniformly across its periphery. The current embodiment of the tracking system 110 is a 'cross' shaped device with four LOSA sensor modules forming two pairs of stereovision line camera systems. The mechanical rig of the tracker module 112 is a hollow structure with guiding-rail like cavity that allows four linear camera (sensor) modules 111 to translate. Each plane pair of the LOSA sensors is capable of tracking the 2D position of the active marker 130. The horizontal and vertical LOSA pairs hence are able to determine 3D position of the active marker 130. The main control and computing board 120 for tracker module 110 resides in the 'square' shaped cavity in the middle of the rig 112. Both the sensor rig 112 and the sensor modules 111 feature array of equidistant holes (113, 216) on their surface which can be aligned and constrained using screws to fix the baseline length of the sensor pairs after adjustment.

Figure 2:
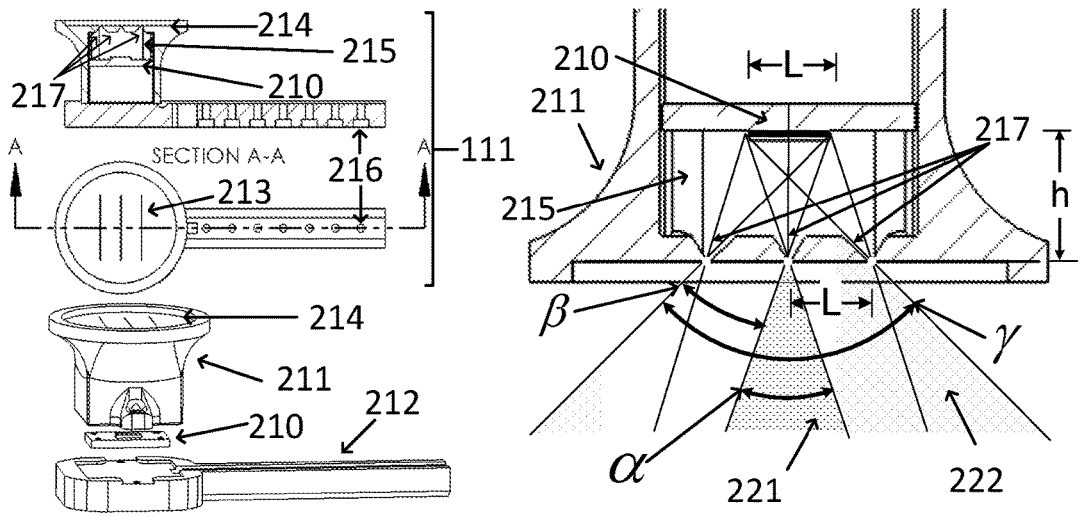
FIG. 2 is a diagram illustrating the shape and mechanical design of the linear camera sensor module of the LOSA tracker module according to embodiments of the present invention.

FIG. 2 is the detailed schematic drawing of the LOSA sensor module 111. The sensor module is composed of three parts: viz. the sensor PCB (upon which the LOSA sensor is mounted) 210, sensor enclosure/obscura 211, and sensor holder 212. The obscura 211 features three optical slots 213 to allow the light from the active marker 130 form images on the LOSA sensor on the sensor board 210. The sensor board 210 is attached to the obscura through two screws on two standoffs 215 extruding from the interior of the obscura 211. The obscura 211 is attached to sensor holder 212 through screws and nuts to make the LOSA sensor module 111 which can be sled into sensor rig 112. The LOSA sensors 210 connect the computing board 120 though slacked wires/ sliding contacts resting on the sensor holder 212. The obscura 211 also features a threaded circular cavity 214 to mount Infra-Red (IR) band pass filters (optional).

Each sensor obscura 211 in the present invention features multiple (three) slots as well as in a unique aperture shape 217 to increase the field of view and spatial resolution of the tracker module 110. The aperture shape of these sensors is created by cutting out 'V-shaped' slots 217 such that light from marker 130 passes through only one of the three slots at a time, 213 forming an image on the LOSA sensor. As shown in FIG. 2, this unique feature virtually creates a separate optical sensor for each optical slot 217, thereby increasing the field of the view. If the slot from which the light passes through is known, the baseline and image location can adjusted (by the distance between the slots) in order to obtain a position estimate. The dimensions of the sensor obscura 211 are determined by the sensor size (L) and needed field-of-view angle ($\gamma$). The field of view is estimated by equation (1), where h is distance of the aperture slot 217 from the sensor plane 210 and $\alpha$ and $\beta$ are the viewing angles for the central and offset slots 217, respectively.

$$\alpha = 2\arctan\frac{L}{2h}; \beta = \arctan\frac{1.5L}{h} - \frac{1}{2}\alpha; \gamma \approx \alpha + 2\beta \qquad (1)$$

The current embodiment of the present invention has been designed to maximize the field of view ($\gamma$) to 90°.

Figure 3:
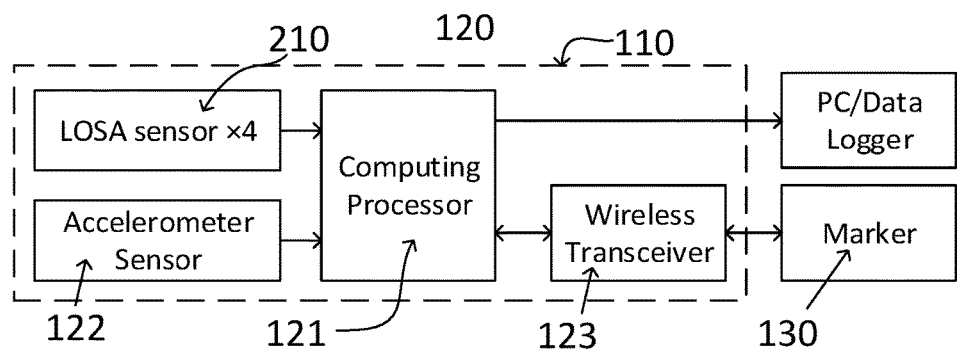
FIG. 3 shows a schematic block diagram illustrating hardware components of the LOSA tracker module according to an embodiment of the present invention.

As described in FIG. 3, the control board 120 of the tracker module 110 hosts a low power computing processor 121 interfaced with a 3-axis accelerometer 122 and a wireless transceiver 123, along with the four LOSA 210 sensors. The LOSA sensors 210 are linearly arranged photo detector arrays (with controllable exposure) used as line cameras with the help of obscura 211. The present embodiment of the invention uses a 128-pixel LOSA sensor with 400 dpi resolution. The LOSA sensor 210 can be upgraded to a sensor with higher pixel count/resolution to improve the tracking accuracy and precision of the invention. The current embodiment of the control board 120 uses an ARM Cortex™ M4 microcontroller as the computing processor 121. However, this can be upgraded to higher power single board/modular computers or a field programmable gate array (FPGA) based application specific integrated circuit (ASIC). The current embodiment of the presented invention uses a wireless local network (WLAN) module based on IEEE 802.11 standard as the wireless transceiver 123 and can be easily replaced with Bluetooth. The current embodiment of the tracker module 110 uses Universal Serial Bus (USB) for power and communication with the host PC. However, various embodiments of the invention may feature battery as a power source and use data loggers (SD Card/ Flash drives) or a wireless interface for data recording and communication with the host computer.

2. Active Marker

The active marker 130 is essentially a platonic polyhedron made up of small (identical) PCBs such that each face (PCB) features a high power (IR or visible) LED 135 in the center. The LEDs 135 on each surface can be independently controlled. The edges of the faces feature castellated holes which are used to solder and connect the PCBs into the desired structural shape. These soldered holes not only provide mechanical strength to the polyhedron structure but also serves as a link to transfer power and signals from one face to another. The active marker polyhedron also holds a 6 axis IMU (Accelerometer and Gyroscope) in the interior of the active marker. A user may attach the active marker system 130 to the object in order to track, measure and record its position and orientation in real-time. The active marker system 130 can be embodied by a marker unit which may be constructed in various shapes such as a Tetrahedron 131 or Cube 132 (and higher order polyhedrons) and is controlled through a battery powered computing board 133. Wireless communication capability between the tracker module 110 and active marker system 130 opens up the possibility of easy integration with wireless telemetry systems (onboard drones, unmanned aerial vehicles, etc.) where wired communication is not feasible.

Figure 4:
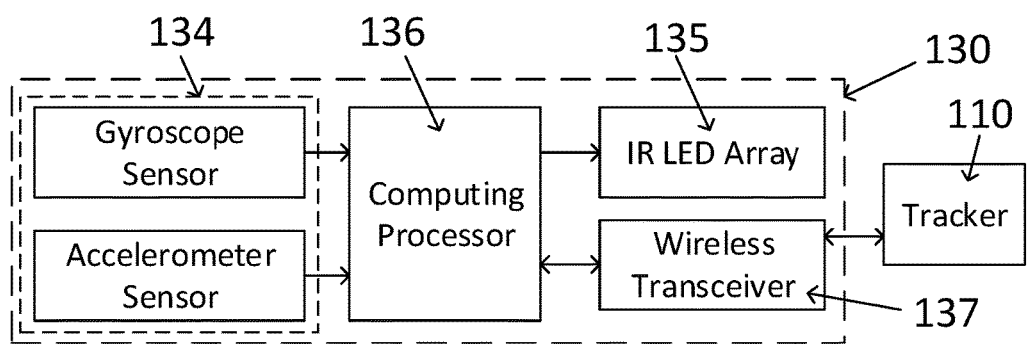
FIG. 4 shows a schematic block diagram illustrating hardware components of an active marker according to an embodiment of the present invention.

The whole setup of the active marker 130 is described in FIG. 4. The active marker operation is controlled by a computing board 133 which hosts a low power computing processor 136 interfaced with a 6-axis IMU 134 (inside marker embodiments 131,132) and a wireless transceiver 137 along with current-control LED drivers. The current embodiment of the control board for the active marker 133 uses an ARM Cortex™ M4 microcontroller as the computing processor 136. The wireless transceiver 137 on the active marker needs to maintain compatibility with the one on the tracker module 123. Hence the current embodiment of the active marker uses WLAN module based on IEEE 802.11 standard as the wireless transceiver 137. The Active Marker is powered with a rechargeable (for example Li—Po) battery 138 to enable wireless operations.

3. Operational Description of the Invention

With respect to the accompanying drawings, operational details of the preferred embodiment of the present invention have been described here. The description taken with the drawings makes apparent to those skilled in the art how the several forms of the invention may be embodied in practice.

Figure 5:
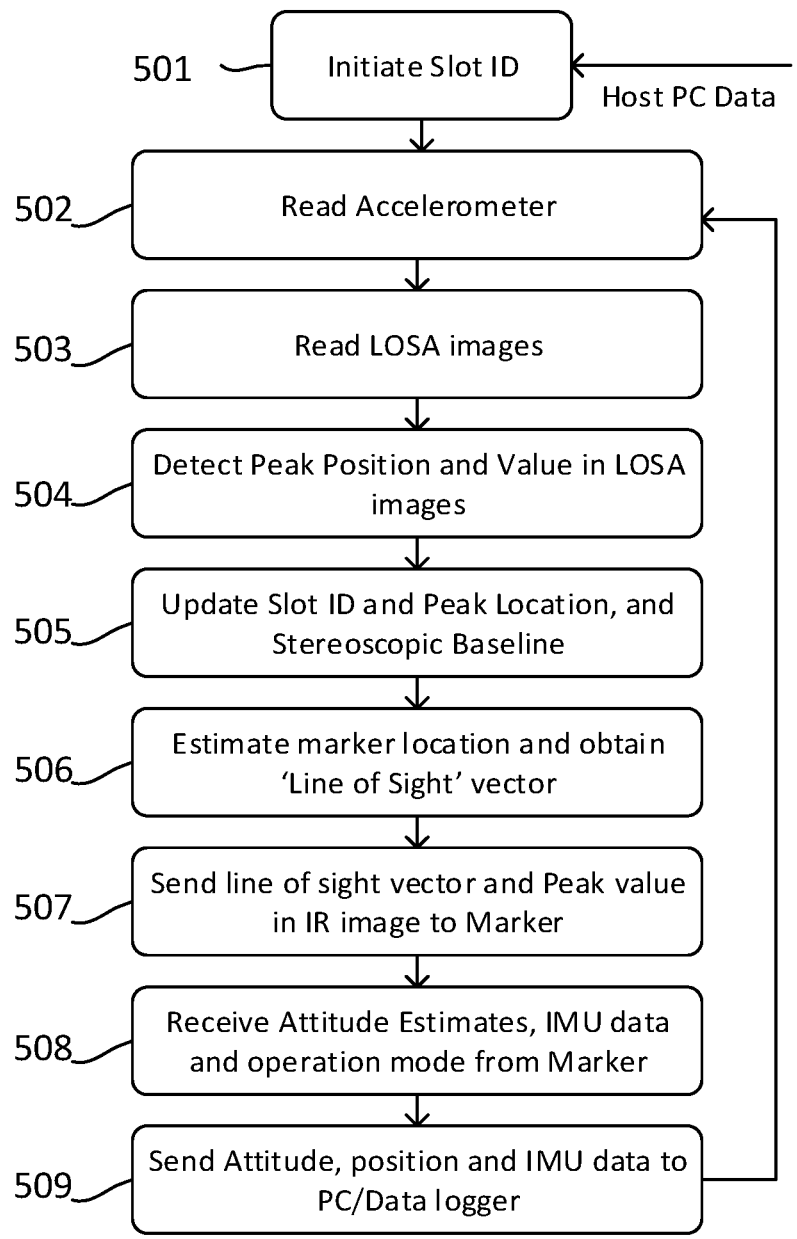
FIG. 5 shows a flow chart illustrating the operation of the LOSA tracker module according to embodiments of the present invention.
Figure 6:
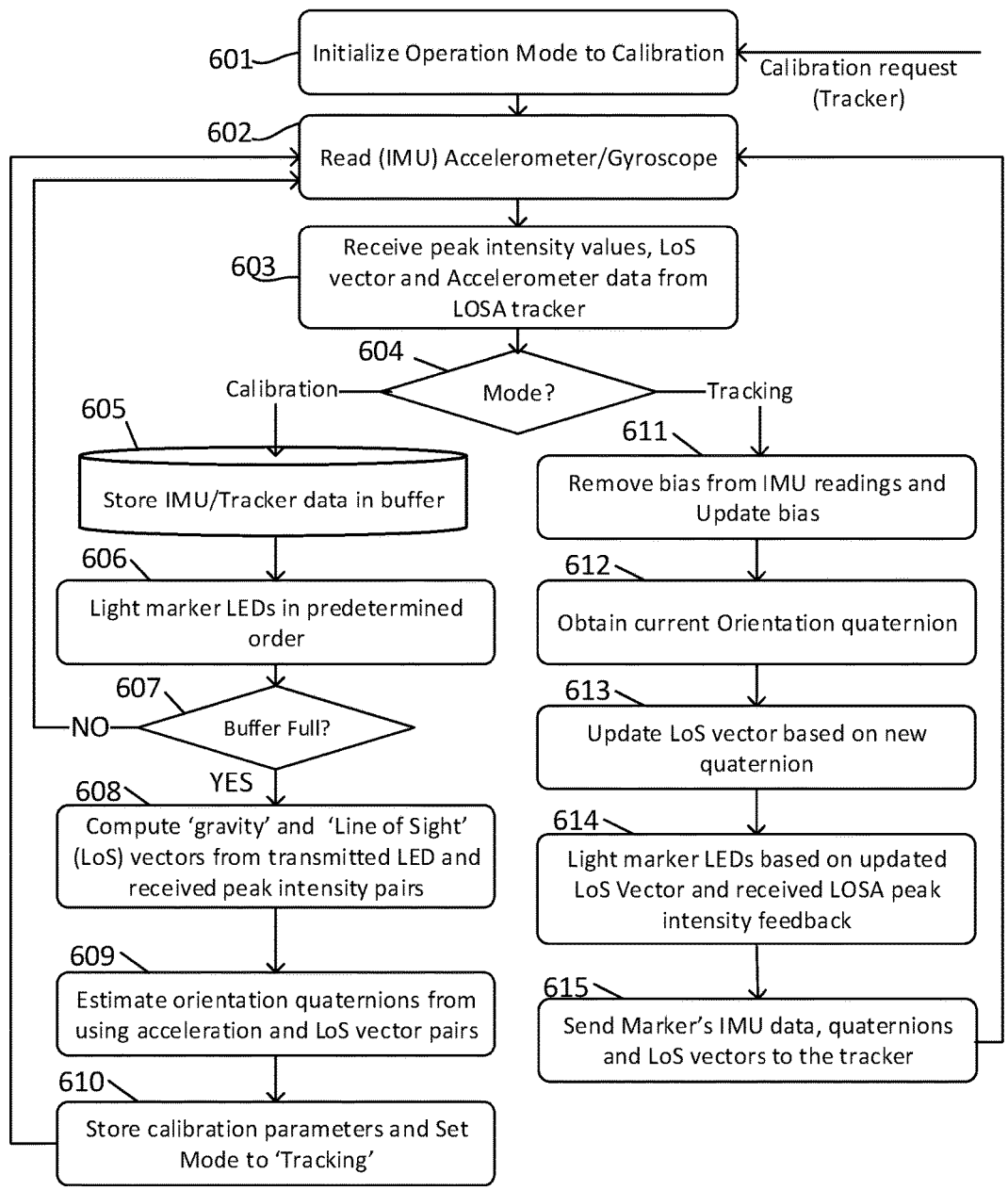
FIG. 6 shows a flow chart illustrating a method for self-calibration, communication and co-operation with the LOSA tracker module according to embodiments of the present invention.

The operation of the present invention features two sensing modalities working in tandem: optical measurement based position tracking and inertial measurement based attitude tracking. The optical tracking is predominantly performed by the tracker module 110 whereas inertial tracking is done by the active marker 130. The operation of the present invention requires the active marker 130 to be visible to all four LOSA sensor modules 111 on the tracker module 110. The computing board 121 estimates the peak position of the active marker light in the LOSA image and computes the position estimates of the active marker through stereovision disparity. The active marker calibrates the IMU sensors, estimates attitude relative to the trackers using the active marker geometry and then tracks the attitude using calibrated inertial measurements. The inertial readings and the position estimates are further processed by the host computer using an Extended Kalman Filter (EKF) to increase the accuracy of the position, velocity and attitude estimates. FIG. 5 and FIG. 6 describe the steps involved in the operation of the tracker module 110 and the active marker 130 respectively in the form of schematic flow diagrams. The following detailed sections taken with the accompanying drawing should make the software implementation and operation of the invention clear to skilled readers.

Tracker Module Operation

Figure 7:
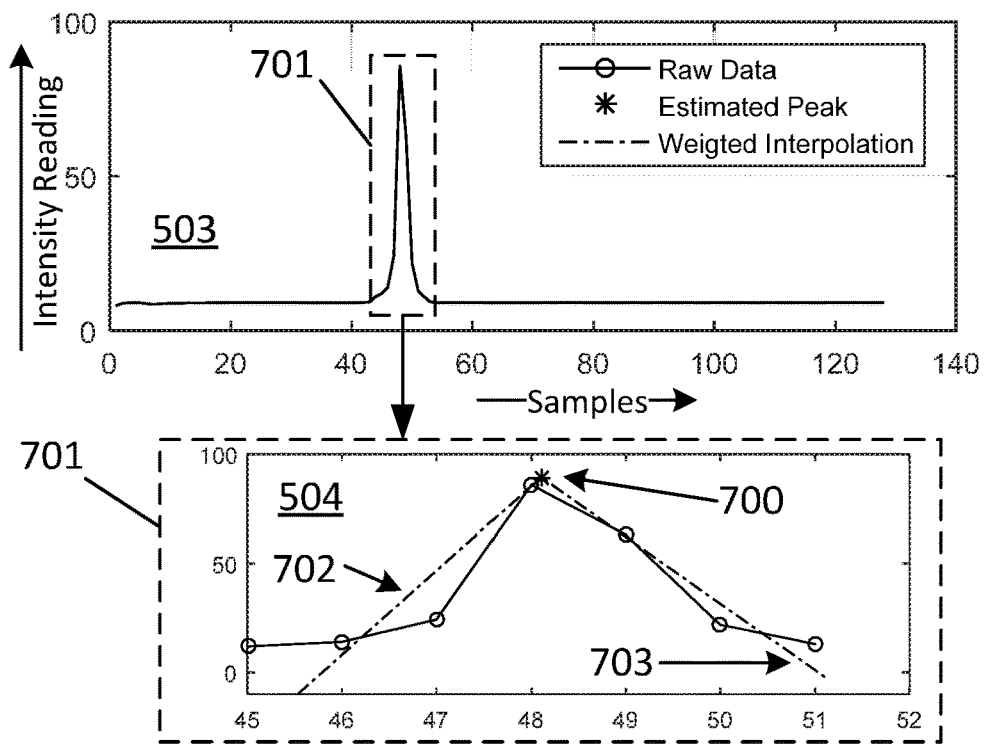
FIG. 7 shows a diagram illustrating the process of peak localization in the LOSA sensor's image.

FIG. 5 is an explanatory flow chart illustrating the operation of the tracker module 110. The operation of tracker 110 starts with the identification of active slots 501 (responsible for the formation of the image on the LOSA sensor 210) among all the aperture slots 213 of the LOSA modules 111. This step (501) by default assigns the central slots as the active slots unless interrupted by the host computer to initialize specific slots depending on the initial location of the active markers 130 respective to the tracker module 110. After initialization of the active slots, the tracker module reads IMU (accelerometer) data (502) and LOSA linear images (503). FIG. 7 shows 1-D image of the active marker on a 128 pixel LOSA sensor used in the current embodiment of the invention (503). For the location estimates from stereovision, accurate location of the active marker image (peaks) in the sensor (to sub-pixel level) is of utmost importance.

To estimate the peak location 700 of the LOSA image (504), the present invention uses a linear model based approach. For the current embodiment of the tracker with a 128-pixel LOSA sensor 210, it is observed that the peak width was always less than 7 pixels. The present approach thus uses a (FIG. 7) window of 7 pixels 701 around the sampled peak position to estimate the actual peak position. The window size depends on the LOSA sensor 210 resolution and the obscura 211 dimensions. To estimate the peak position (504), the proposed method uses a two-stage method. First, the approximate center position is estimated through a weighted mean of the indices of the pixels in the local maxima window where intensity values correspond to the weights. Then, this approximate center is used to divide the pixels in the window into two groups (one on the left of the peak and another on the right). The weighted least squares method is used to model the two groups of the points with two lines 702, 703. The intersection of the two lines was taken as the peak position and is considered as the final peak location 700.

Since the aperture 217 is designed to allow light only from one slot at a time to form an image on the sensor 210, changes in the active slot during operation result in the phase wrap of the peak data in the sensor image. The current embodiment of the present invention tracks the peak location 700 continuously for all the LOSA modules 111 and updates (increments or decrements) the slot ID depending upon the direction of the peak during phase wrap events 505. An update in the active slot also results in an offset in the peak location by the sensor size. For the current embodiment of the invention the offset length is 128 pixels. This process virtually adds two additional LOSA sensors thereby increasing the field of view and resolution. The process keeps track of the active slot for all LOSA modules 111 after initialization in the process 501. In addition to the peak location, the baseline (distance between the optic centers) of the stereoscopic LOSA module pair is also updated by an offset in steps of sensor size (128 pixels for the current embodiment of the invention).

The process 506 involves estimation of the position of the active marker and corresponding line of sight vector in the tracker module's frame of reference. Position estimates of the active marker are obtained through planar stereovision. Given a pair of aligned sensors the planar (say X-Z plane) position of the light source {X,Y,Z} may be calculated using stereo triangulation as follows:

$$X = b_x \frac{x_L + x_R}{2(x_L - x_R)}, \quad Y = b_y \frac{x_D + x_U}{2(x_U - x_D)}, \qquad (2)$$

$$Z = \frac{1}{2} \cdot \left( \frac{b_x h}{x_L - x_R} + \frac{b_y h}{x_U - x_D} \right).$$

Here $\{x_R, x_L\}$ and $\{x_U, x_D\}$ are the peak locations (700) in the images of the horizontal and vertical stereoscopic pairs of the LOSA modules, respectively. In similar manner, $b_x$ and $b_y$ are the current baselines for the horizontal and vertical stereoscopic LOSA pairs, respectively, and h is the normal distance (in pixel units) between the sensor and aperture slot. The tracker module computes the 'Line of Sight' (LoS) vector point towards the active marker in its frame of reference by normalizing the 3D position vector obtained from equation (2) to a unit vector.

In the process 507 and 508 the tracker module 110 sends out the LoS vector and peak light intensity (received by the tracker) wirelessly to the active marker 130 and receives IMU data, attitude estimates and 'marker status' in return. The tracker module 110 finally sends the position, attitude, (marker) IMU data and status information to the host computer or data logger for processing and/or storing 509 and repeats the process from 502.

Active Marker Operation

FIG. 6 is an explanatory flow chart illustrating the operation of the active marker system 130. At any point in time, the active marker 130 either operates in the regular 'tracking' or 'calibration' mode. During such, it is necessary to keep the active marker 130 stationary to prevent any motion related noise in the IMU 134 measurements. The operation of active marker 130 starts with setting the operation mode to 'calibration' 601. This process (601) can also be invoked by an interrupt request issued by the tracker module 110 to recalibrate the system intentionally. Independent of the operation mode, the active marker 130 reads inertial data 602 from the onboard IMU 134 and receives 603 data (LOSA Peak intensity, LoS vector, accelerometer and interrupt commands) sent by the tracker module during process 508. The active marker checks 604 the operation mode and proceeds according to the mode.

For 'Calibration Mode', in the process 605, the active marker 130 stores IMU data 602 and tracker module data 603 in a buffer for some fixed number of samples. For the current embodiment of the invention, the buffer size is set to 600 samples for the cube marker and 400 for the tetrahedral marker. During this process, the active marker LEDs are lit sequentially 606 (with only one lit at a time) with fixed intensity. This process continues until the buffer is filled 607. Once the data recording for the calibration process is over, the active marker computes its attitude relative to the tracker module from the recorded data and stores IMU calibration parameters.

Figure 8:
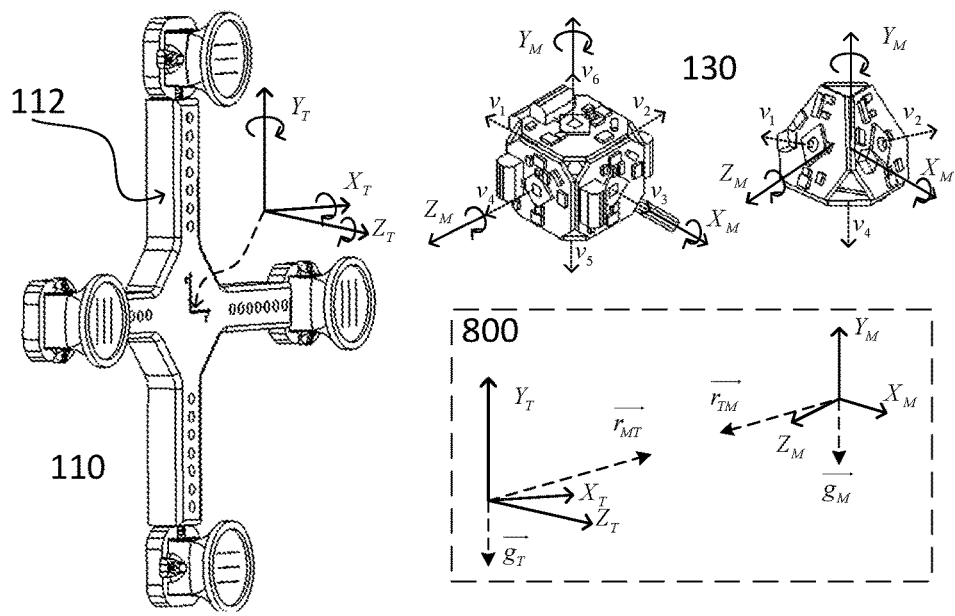
FIG. 8 shows a diagram illustrating frame of reference assignment to the LOSA tracker module and active markers according to embodiments of the present invention.

To estimate the attitude of the active marker 130 with respect to the sensor 110, at least two non-parallel vectors are necessary in both frames of reference. As shown in FIG. 8, the present invention uses LoS and gravity vectors to obtain the attitude estimates. As the active marker is stationary during the calibration phase, accelerations measured in this phase are gravity measurements. The gravity vectors can be computed 608 by normalizing the vectors obtained in the processes 602, 603 and 605 from the accelerometer.

Figure 9:
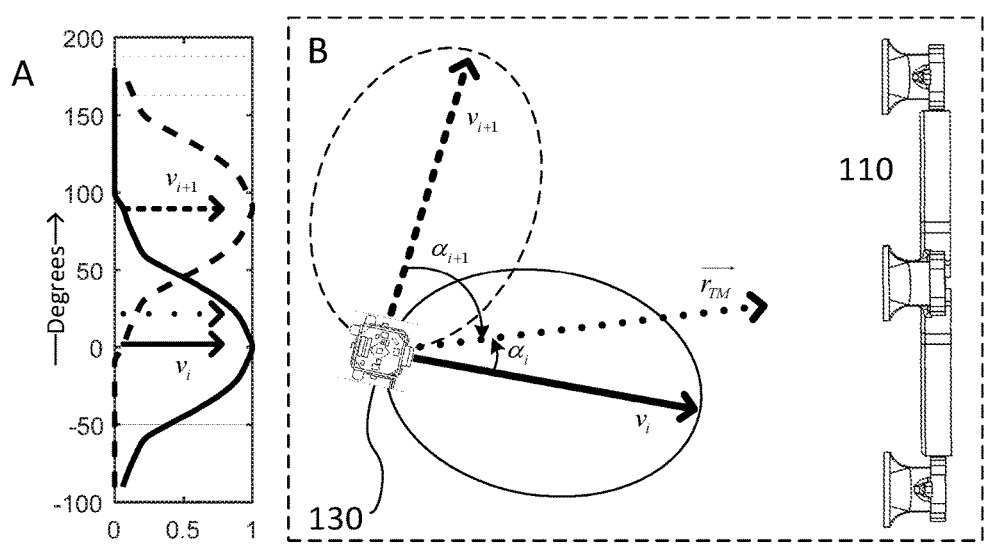
FIG. 9 shows a diagram illustrating the process of Line of Sight vector using the active marker's geometry according to embodiments of the present invention.

The FIG. 8 also shows the frame of reference assignment to both tracker module 110 and active marker 130 along with the face vectors ($v_i$) normal to the active marker surface planes, pointing outwards. The present invention uses the sensor geometry (face vectors) to estimate the LoS vector point towards the tracker module in the active marker's frame of reference ($\vec{r_{TM}}$). As shown in the FIG. 9, the IR intensity received by the tracker module varies with the viewing angle ($\alpha_i$) with respect to the central axis of the LED (face vectors, $v_i$). LoS vector ($\vec{r_{TM}}$) can be estimated 608 from the received peak intensities (from the tracker module) in process 603 and 605 by taking the weighted average of the LED's direction vectors as shown in equation (3).

$$\vec{r_{TM}} = \frac{\sum_{i=1}^{N} w_i(I, \alpha_i) \cdot \vec{v_i}}{\sum_{i=1}^{N} w_i(I, \alpha_i)} \qquad (3)$$

Here, $\alpha_i$ are the viewing angles of the LEDs in the active marker, I is the input intensity of the LEDs and $w_i$ represents the weights of the weighted average which are obtained by the IR intensities received by the LOSAs during the calibration phase (603, 605). The LoS vector in the tracker module's frame of reference is obtained 608 by taking the mean of the LoS readings obtained in processes 506, 603 and 605.

The LoS vector and the gravity vector are two vectors which are known in both frames of reference (FIG. 8). These pairs of vectors are used to obtain the attitude 609 of the active marker 130 with respect to the tracker module 110.

$$g_M = R_T^M g_T; \ \vec{t_{TM}} = -R_T^M \vec{r_{TM}}; \qquad (4)$$

Here, g is the gravity vector, $R_T^M$ is the rotation matrix to transform coordinates from tracker to active marker's frame of reference, $\vec{r_{MT}}$ represents the LoS vector pointing to the active marker in the tracker's frame of reference, and $\vec{r_{TM}}$ represents the LoS vector pointing to the tracker module in the active marker's frame of reference. The subscripts T and M denote the tracker module and active marker frame of reference, respectively. The rotation matrix $R_T^M$ can be obtained by solving equation (4) as follows:

$$R_T^M = [g_M \vec{r_{TM}}][g_T \vec{r_{MT}}]^+ \qquad (5)$$

Here '+' represents the pseudoinverse of the matrix composed of quantities in the tracker module's frame of reference. $R_T^M$ can also be written in terms of the unit quaternion vector $Q = [q_0 \ q_1 \ q_2 \ q_3]^T$ as shown in equation (6).

$$R_T^M(Q) = \begin{bmatrix} 1-2(q_1^2+q_2^2) & 2(q_0q_1+q_3q_2) & 2(q_0q_2-q_3q_1) \\ 2(q_0q_1-q_3q_2) & 1-2(q_0^2+q_2^2) & 2(q_1q_2+q_3q_0) \\ 2(q_0q_2+q_3q_1) & 2(q_1q_2-q_3q_0) & 1-2(q_0^2+q_1^2) \end{bmatrix}, \qquad (6)$$

where Q represents the rotation (attitude) of the active marker with respect to the sensor's frame of reference. In addition to the attitude estimates, the active marker 130 also calibrates the gyroscope 610 sensors by computing the offset (DC bias) in the gyroscope measurements. The system computes the offset/drift by taking the mean of the gyroscope readings obtained in processes 602 and 605. After obtaining the attitude and the gyroscope bias, the active marker sets 610 the operation mode to 'Tracking', where the normal attitude tracking process takes place.

Figure 10:
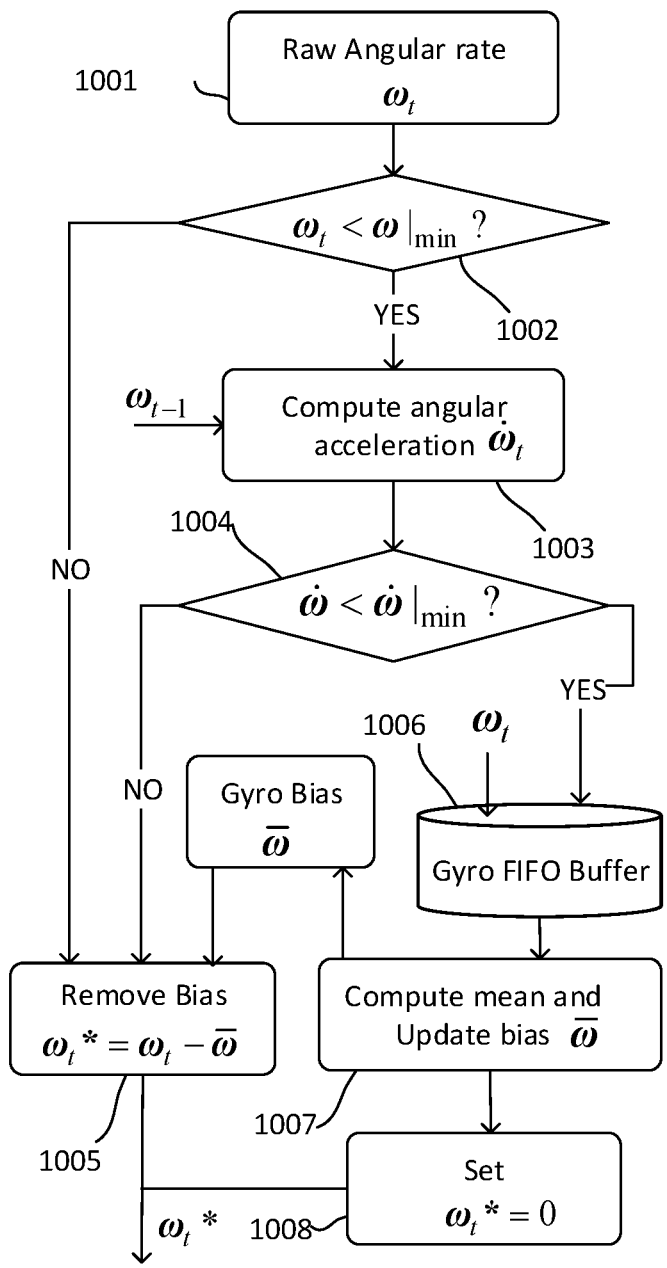
FIG. 10 shows a flow chart illustrating a method for Gyroscope bias estimation and correction.

During the 'tracking' mode, instead of storing IMU data 605, the active marker IMU data is used to track the orientation relative to the attitude estimate obtained in process 609. During this mode, the IMU readings are corrected 611 for any drift in the gyroscope sensor measurements. FIG. 10 explains the process 611 in detail.

The present invention identifies stationary (no rotation) phases of motion of the active marker 130 from angular rates and angular acceleration measurements. The process 611 starts with acquiring the raw measurements 602/1001 (gyroscope). The gyroscope measurements ($\omega_r$) are then compared 1002 against some preset threshold to identify whether the active marker is stationary. In addition to angular rates, the angular acceleration ($\dot\omega$) is computed 1003 and compared against another preset threshold 1004. If either the angular rates or acceleration measurement exceed their respective threshold, the system is assumed to be in a state of motion and the angular rates are corrected 1105 by subtracting the gyroscope drift ($\bar\omega$) estimated in process 610 to obtain the corrected angular rates ($\omega_r^*$) for attitude tracking. However, if both measurements fall below their respective thresholds, the active marker is assumed to be in a stationary phase and the gyroscope measurements ($\omega_t$) are pushed into the FIFO buffer 1006 of process 605. The new estimates of gyroscope drift ($\bar{\omega}$) are computed by taking the mean 1007 of the gyroscope measurements stored in the buffer. In addition to this, the corrected angular rates ($\omega_t^*$) are set to zero 1008 as the active marker is assumed to be in a stationary state. The corrected angular rates ($\omega_t^*$) are then used in tracking the attitude of the active marker.

The rotation quaternion Q is updated 612 by integrating corrected angular rates ($\omega_t^*$) on the computing board of the active marker as shown in the following equation:

$$Q_{t+1} = Q_t + \dot{Q}_t(Q_t, \vec{\omega}_t^s *) \cdot \delta t; \tag{7}$$

$$\dot{Q}(Q, \vec{\omega}) = 0.5 \begin{bmatrix} q_0 & q_3 & -q_2 & q_1 \\ q_1 & q_2 & q_3 & -q_0 \\ q_2 & -q_1 & q_0 & q_3 \\ q_3 & -q_0 & -q_1 & -q_2 \end{bmatrix} \begin{bmatrix} 0 \\ \omega_x \\ \omega_y \\ \omega_z \end{bmatrix}.$$

The obtained unit quaternions Q can be converted to Euler angles to represent attitude in 'human readable' format.

The obtained attitude quaternion in the equation can be used to update the LoS vector 613. The new LoS vector, along with the peak intensity feedback (received during process 603), are used to light 614 the LEDs facing the tracker module, while at the same time limiting the maximum intensity of the LEDs to ensure the minimum peak level on the tracker module is just enough to identify the peak location. This process enables the active marker to minimize power usage and extend battery life. Finally, the active marker sends the IMU measurements, attitude quaternions and LoS vector to the tracker module 615 to be sent to the host computer for further processing and recording.

Amalgamation of Optical and Inertial Sensing

The present invention uses an Extended Kalman Filter (EKF) to fuse the IMU based inertial measurements with the optical tracking data to obtain position and attitude estimates of the active marker 130 with respect to LOSA tracker module 110. In addition to the position and attitude estimates, the active marker's real-time angular rates and linear acceleration obtained from the tracker in the process 509 can be used to further improve tracking accuracy with the help of EKF. In the current embodiment of this invention, the EKF is implemented on the host computer; however, this algorithm can be implemented on the computing processor 121 of the LOSA tracker module 110 after required upgrades.

The state vector for the EKF [3] is composed of position, velocity and rotation (unit) quaternion estimates of the active marker with respect to the sensor's frame of reference. To fuse attitude information with linear position/velocity information, the linear acceleration measurement from the active marker's IMU is used. The acceleration measured by the IMU on the active marker consists of three components viz. gravity, rotational acceleration and linear acceleration as shown in (8).

$$\vec{acc}^T = R_M^T(Q) \begin{bmatrix} a_{X'}^M - \omega_{Y'}^M V_{Z'}^M + \omega_{Z'}^M V_{Y'}^M \\ a_{Y'}^M + \omega_{X'}^M V_{Z'}^M - \omega_{Z'}^M V_{X'}^M \\ a_{Z'}^M - \omega_{X'}^M V_{Y'}^M + \omega_{Z'}^M V_{Y'}^M \end{bmatrix} - \begin{bmatrix} 0 \\ -g \\ 0 \end{bmatrix} \tag{8}$$

Here $\vec{acc}^T$ represents the linear acceleration vector experienced by the active marker in the tracker module's frame of reference whereas $a_{X',Y',Z'}^M$ and $\omega_{X',Y',Z'}^M$ represent the IMU readings (accelerometer and gyroscope respectively) for the active marker in the active marker's frame of reference. The state estimates are updated by integrating measurements and previous state estimates as follows:

$$\begin{bmatrix} \vec{p}_{k+1}^s \\ \vec{p}_{k+1}^s \\ Q_{k+1} \end{bmatrix} = \begin{bmatrix} \vec{p}_k^s + \vec{v}_k^s \cdot \delta t \\ \vec{v}_k^s + R_m^s(\vec{a}_k^m - R_s^m g_s - \vec{\omega}_k^m \times R_s^m \vec{v}_k^s) \cdot \delta t \\ Q_k + \dot{Q}_k(Q_k, \vec{\omega}_k^s) \cdot \delta t \end{bmatrix} \tag{9}$$

The quaternion rate is obtained from measured angular rates as shown in equation (7).

As position and linear velocity (obtained from time derivative of position) are the only observable system variables in the invention, the following observation model is used.

$$\begin{bmatrix} \vec{p} \\ \vec{v} \end{bmatrix} = \begin{bmatrix} I_3 & 0 & 0 \\ 0 & I_3 & 0 \end{bmatrix} \begin{bmatrix} \vec{p}_k^s \\ \vec{v}_k^s \\ Q_k^s \end{bmatrix} \tag{10}$$

where $I_3$ represents an identity matrix of size 3.

In general, EKF can be used to solve for any non-linear stochastic process of the form:

$$\begin{matrix} x_k = f(x_{k-1}, u_k) + w_k \\ y_k = h(x_k) + v_k \end{matrix} \Big\} w_k \in N(\vec{0}, Q_k), v_k \in N(\vec{0}, R_k) \tag{11}$$

where $x_k$ is the state vector, $u_k$ is the control input vector and $w_k$ and $v_k$ are the process and measurement noise vectors, respectively. The noise vectors $w_k$ and $v_k$ are assumed to follow multivariate Gaussian distribution with $Q_k$ and $R_k$ as covariance matrices. The state and measurement models (10) are linearized, making use of the Jacobian Matrices F and H.

$$F_k = \frac{\partial f}{\partial x}\Big|_{x=\hat{x}_k, u_k}, H_k = \frac{\partial h}{\partial x}\Big|_{x=\hat{x}_k} \tag{12}$$

During the 'prediction' stage of EKF, state estimates ($\hat{x}$) and the covariance matrix for the state estimates (P) are predicted as follows:

$$\hat{x}_{k|k-1} = f(x_{k-1|k-1}, u_k)$$

$$P_{k|k-1} = F_k P_{k-1|k-1} F_k^T + Q_k \tag{13}$$

After the prediction stage, these estimates are corrected based on measurements during the 'update' stage of EKF as follows:

$$\tilde{y} = y_k - h(\hat{x}_{k|k-1})$$

$$S_k = H_k P_{k|k-1} H_k^T + R_k$$

$$K_k = P_{k|k-1} H_k^T S_k^{-1}$$

$$\hat{x}_{k|k} = \hat{x}_{k|k-1} + K_k \tilde{y}$$

$$P_{k|k} = (I - K_k H_k) P_{k|k-1} \tag{14}$$

where $\tilde{y}$, $S_k$, $K_k$ and I represent measurement residuals, residual covariance matrix, Kalman gain and identity matrix, respectively.

The current embodiment of the invention features a distributed computing architecture where both active marker 130 and tracker module 110 perform their computing tasks independently without the need of any additional device for motion (position and attitude) tracking. The EKF implementation is an additional and optional feature of the present invention to reduce measurement noise.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A motion-tracking system utilizing opto-inertial sensing comprising:
   a tracker module comprising:
      multiple linear optical sensor array (LOSA) sensor modules acting as stereo-line cameras to measure position of a light source with multi-slit apertures;
      an adjustable rig to act as a mounting frame for the LOSA sensor modules; and
      a computing board rigidly mounted on the adjustable rig with a 3-axis accelerometer sensor, wireless transceiver and computing processor interfacing with the LOSA sensor modules;
   a polyhedron shaped active marker comprising:
      printed circuit board (PCB) facets with light emitting diodes (LED), as said light source, mounted on the facets;
      a 6-axis inertial measurement unit (IMU) accelerometer and gyroscope fitted inside, which can be mounted to any object to be tracked, subject to translations and rotations; and
      a battery powered computing board for data-acquisition, LED control, computation and facilitation of bidirectional wireless communication with the tracker module.

2. The motion-tracking system of claim 1, wherein the LOSA sensor modules possess said multiple slit apertures which are designed to allow light from only one slit to form an image on a surface of the LOSA sensor modules, thereby increasing the field of view and sensor resolution by making the LOSA sensor module to act as an additional virtual sensors.

3. The motion-tracking system of claim 1, wherein the adjustable rig further includes a plurality of guiding rails having uniformly placed holes to adjust the effective baseline length for adjustment of the optimum operating range.

4. The motion-tracking system of claim 1, wherein a cavity is provided on a housing of the LOSA sensor modules to mount wavelength specific optical filters to minimize the effect of noise in unwanted light wavelengths.

5. The motion-tracking system of claim 1, wherein both the tracker module and the active marker possess independent computing processors, thus resulting in a self-contained system with no or minimal computational load on a host computer, thereby providing plug and play capability.

6. A method for tracking the position and attitude of a polyhedron shaped active marker relative to a tracker module using polyocular vision with inertial sensing, the method comprising:
   capturing multiple images of the polyhedron shaped active marker, which is constructed of printed circuit board facets with light emitting diodes (LED) mounted on the facets, using multiple linear optical sensor array (LOSA) sensor modules having multi-slit apertures mounted on an adjustable rig of the tracker module;
   calculating, at a first processor of the tracking module, a peak position of the light received from the LED using the images from the LOSA sensor modules, and a line of sight (LoS) using the peak position of the light, a distance between LOSA sensor modules, and accelerometer data from an accelerometer mounted on the tracker module;
   determining, at a second processor of the active marker, an initial orientation of the active marker relative to the tracker module using gravity and line of sight vectors measured in both a frame of reference of the active marker and a frame of reference of the tracking module and the integration of angular rate measurements from a 6-axis inertial measurement unit (IMU) accelerometer and gyroscope mounted on the active marker; and
   tracking an object based on the determined initial orientation.

7. The method of claim 6, further comprising:
   estimating a LoS vector pointing towards the tracker module in the active marker's frame of reference through directed illumination; and
   directing illumination of the LED's by powering only the LED's facing the tracking module.

8. The method of claim 6, further comprising:
   processing the outputs of the LOSA sensor module and the IMU accelerometer and gyroscope using an extended Kalman filter to deliver accurate position, velocity, and attitude estimates of the active marker with respect to the tracker module.

9. The method of claim 6, further comprising:
   enabling wireless communication between the active marker and the tracker module;
   limiting the intensity of the LEDs on the active marker to maintain a minimum light intensity level by leveraging a peak intensity feedback received from the tracker module to increase power efficiency; and
   transmitting outputs of the IMU accelerometer and gyroscope from the active marker to a host computer through the tracker module for further processing and recording.

10. The method of claim 6, further comprising:
    utilizing predetermined minimum thresholds of angular rate and angular acceleration to detect a stationary phase of the active marker in order to update the gyroscope bias values, thereby minimizing errors in attitude estimation resulting from environment dependent gyroscope drifting.

11. The method of claim 6, further comprising:
    utilizing linear interpolation through weighted least squares to obtain sub-pixel accuracy in the peak position calculation.

* * * * *